United States Patent
Carlesimo et al.

(10) Patent No.: US 9,969,357 B1
(45) Date of Patent: May 15, 2018

(54) VEHICLE WIPER INTERMITTENT CONTROL

(71) Applicant: GM GLOBAL TECHNOLOGY OPERATIONS LLC, Detroit, MI (US)

(72) Inventors: Daniel P. Carlesimo, Macomb Township, MI (US); Marcelo V. Lazarini, Macomb Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days. days.

(21) Appl. No.: 15/221,485

(22) Filed: Jul. 27, 2016

(51) Int. Cl.
  *G05D 3/00* (2006.01)
  *B60S 1/08* (2006.01)
  *B60K 35/00* (2006.01)
  *B60K 37/06* (2006.01)

(52) U.S. Cl.
  CPC ............ *B60S 1/0807* (2013.01); *B60K 35/00* (2013.01); *B60K 37/06* (2013.01)

(58) Field of Classification Search
  CPC ... G05D 3/00; G05D 3/12; G05B 5/00; H02P 1/00; H02P 1/04; H02P 6/00; H02P 7/00
  USPC .......... 318/400.01, 266, 280, 286, 466, 560, 318/700, 430, 685, 696, 432; 388/800, 388/811
  See application file for complete search history.

(56) References Cited

U.S. PATENT DOCUMENTS

| 4,689,535 | A  | * | 8/1987  | Tsunoda ................ | B60S 1/185 15/250.17 |
| 4,705,997 | A  | * | 11/1987 | Juzswik ................. | H02P 7/04 318/293 |
| 6,281,649 | B1 | * | 8/2001  | Ouellette ............... | B60S 1/0416 15/250.12 |
| 7,423,399 | B2 | * | 9/2008  | Pawlicki ............... | B60S 1/0807 318/283 |
| 8,405,336 | B2 | * | 3/2013  | Natsume ................ | B60S 1/08 318/266 |
| 9,031,390 | B2 | * | 5/2015  | Natsume ................ | H02P 1/22 318/266 |
| 2013/0251352 | A1 | * | 9/2013  | Natsume ................ | H02P 1/22 388/854 |

* cited by examiner

*Primary Examiner* — Antony M Paul
(74) *Attorney, Agent, or Firm* — Lorenz & Kopf, LLP

(57) ABSTRACT

Methods, systems, and vehicles are provided for controlling intermittent operation of windshield wiper systems for vehicles. In accordance with one embodiment, a control system for a vehicle windshield wiper system includes one or more detection units and a processor. The one or more detection units are coupled to a user interface disposed onboard the vehicle, and are configured to detect an amount of time pertaining to a position or engagement of a user interface for the wiper system. The processor is coupled to the one or more detection units, and is configured to at least facilitate updating a time step for intermittent operation for the wiper system based at least in part on the amount of time.

16 Claims, 8 Drawing Sheets

VEHICLE WIPER INTERMITTENT CONTROL

TECHNICAL FIELD

The present disclosure generally relates to vehicles, and more particularly relates to methods and systems pertaining to windshield wiper assemblies for vehicles.

BACKGROUND

Today's vehicles often include wiper systems for windshields of the vehicles. The wiper systems may include intermittent wiper controls, for example for wipers that operate with a time delay. However, in certain situations, existing wiper controls may not always be ideal, for example with respect to a user's engagement, intermittent wiper control, and/or for providing feedback control.

Accordingly, it is desirable to provide techniques for improved control of operation of vehicle windshield wiper systems. It is also desirable to provide methods, systems, and vehicles utilizing such techniques. Furthermore, other desirable features and characteristics of the present invention will be apparent from the subsequent detailed description and the appended claims, taken in conjunction with the accompanying drawings and the foregoing technical field and background.

SUMMARY

In accordance with an exemplary embodiment, a method is provided. The method comprises detecting, via a detection unit disposed onboard a vehicle having a windshield and a wiper system for the windshield, a tapping of a user interface for the wiper system; and controlling the wiper system based at least in part on the tapping of the user interface.

In accordance with another exemplary embodiment, a method is provided. The method comprises detecting, via a detection unit disposed onboard a vehicle having a windshield and a wiper system for the windshield, a user's engagement of a user interface for the wiper system; controlling an intermittent speed of the wiper system based on the user's engagement of the user interface; and storing a setting for the intermittent speed for subsequent use in a future driver cycle for the vehicle.

In accordance with a further exemplary embodiment, a method is provided. The method comprises detecting, via a detection unit disposed onboard a vehicle having a windshield and a wiper system for the windshield, an amount of time pertaining to a position or engagement of a user interface for the wiper system; and updating a time step for intermittent operation for the wiper system based at least in part on the amount of time.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
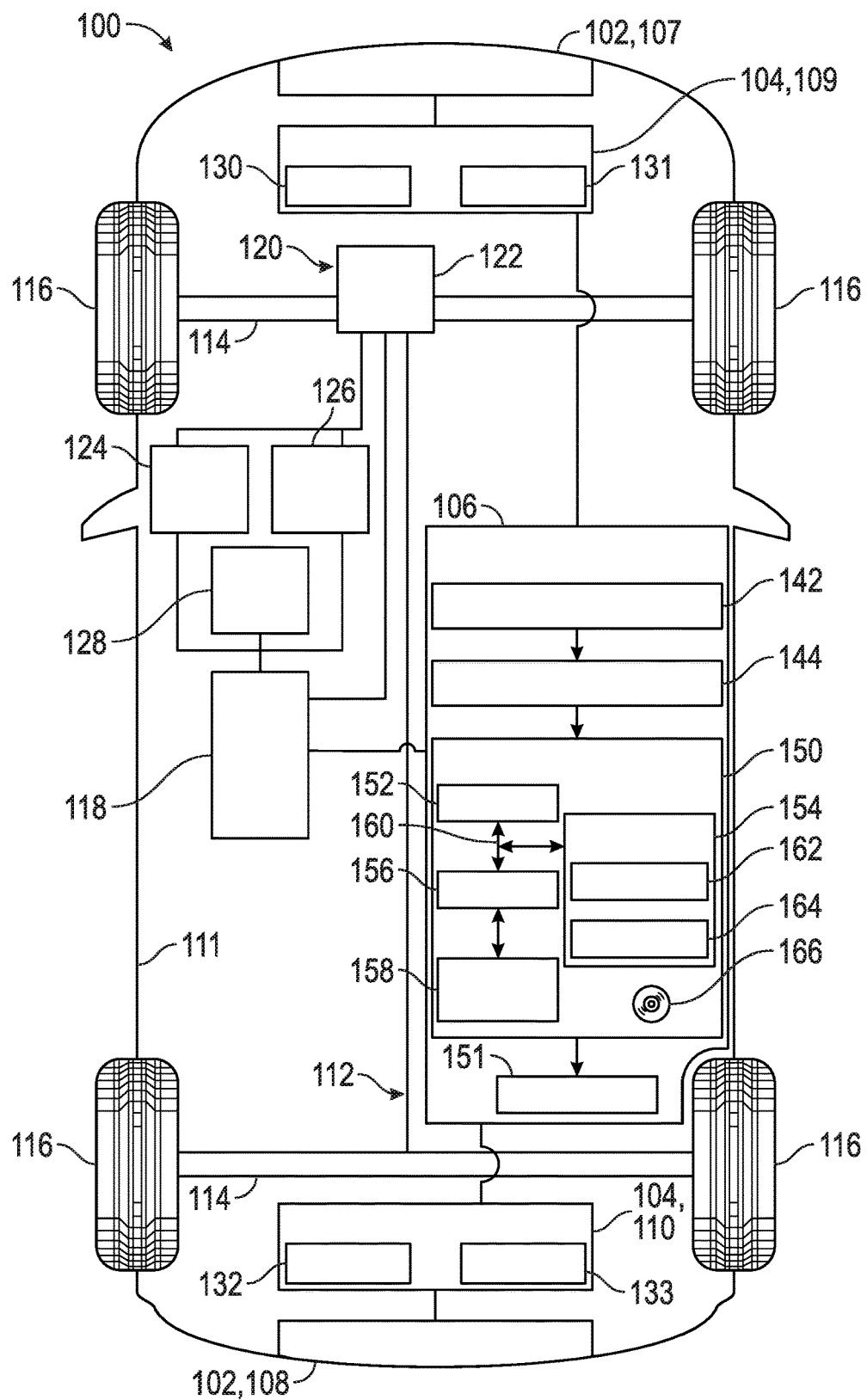
FIG. 1 is a functional block diagram of a vehicle that includes front and rear windshields, wiper assemblies for the windshields, and a control system for controlling the wiper assemblies, in accordance with an exemplary embodiment.

FIG. 1 illustrates a vehicle 100, or automobile, according to an exemplary embodiment. The vehicle 100 may be any one of a number of different types of automobiles, such as, for example, a sedan, a wagon, a truck, or a sport utility vehicle, and/or one or more other types of vehicles.

As described in greater detail further below, the vehicle 100 includes windshields 102, respective wiper systems 104 for the windshields 102, and a control system for controlling the wiper systems 104. In various embodiments, the vehicle 100 (and the associated systems and methods described below) allows for the use of a tap-up and tap-down feature for controlling one or more of the wiper systems 104. Also in various embodiments, the vehicle 100 (and the associated systems and methods described below) allow for the use of smart compensation techniques for controlling intermittent speed of the wiper blades of one or more of the wiper systems 104, for example by storing the intermittent speed setting for subsequent use rather than automatically reverting back to a factory setting. Also in various embodiments, the vehicle 100 provides for potentially improved techniques for understanding a customer's input, and in certain embodiments also provides a display feedback for the customer.

In the depicted embodiment, the windshields 102 include a front windshield 107 (at a front portion of the vehicle 100) and a rear windshield 108 (at a rear portion of the vehicle 100). Also in the depicted embodiment, the wiper systems 104 include a front wiper system 109 for the front windshield 107 and a rear wiper system 110 for the rear windshield 108. It will be appreciated that the number of windshields 102 and/or wiper systems 104 may vary in other embodiments. As described further below, control of operation of the windshields 102 is provided via the control system 106 based on a user's interaction with, including tapping up or down with respect to, an interface 142 of the control system 106, for example as forth in greater detail further below in connection with the discussion of FIGS. 2-6.

In one embodiment depicted in FIG. 1, the vehicle 100 includes, in addition to the above-referenced windshields 102, wiper systems 104, and control system 106, a chassis 112, a body 111, four wheels 116, an electronic system 118, a powertrain 120, a steering system 124, a braking system 126, and one or more other driver input systems 128. The body 111 is arranged on the chassis 112 and substantially encloses the other components of the vehicle 100. The body 111 and the chassis 112 may jointly form a frame. The wheels 116 are each rotationally coupled to the chassis 112 near a respective corner of the body 111. As depicted in FIG. 1, each wheel 116 comprises a wheel assembly that includes a tire as well as a wheel and related components (and that are collectively referred to as the "wheel 116" for the purposes of this Application). In various embodiments the vehicle 100 may differ from that depicted in FIG. 1.

In the exemplary embodiment illustrated in FIG. 1, the powertrain 120 includes an actuator assembly that includes an engine 122. In various other embodiments, the powertrain 120 may vary from that depicted in FIG. 1 and/or described below. Still referring to FIG. 1, in one embodiment, the engine 122 is coupled to at least some of the wheels 116 through one or more drive shafts 114.

Figure 2:
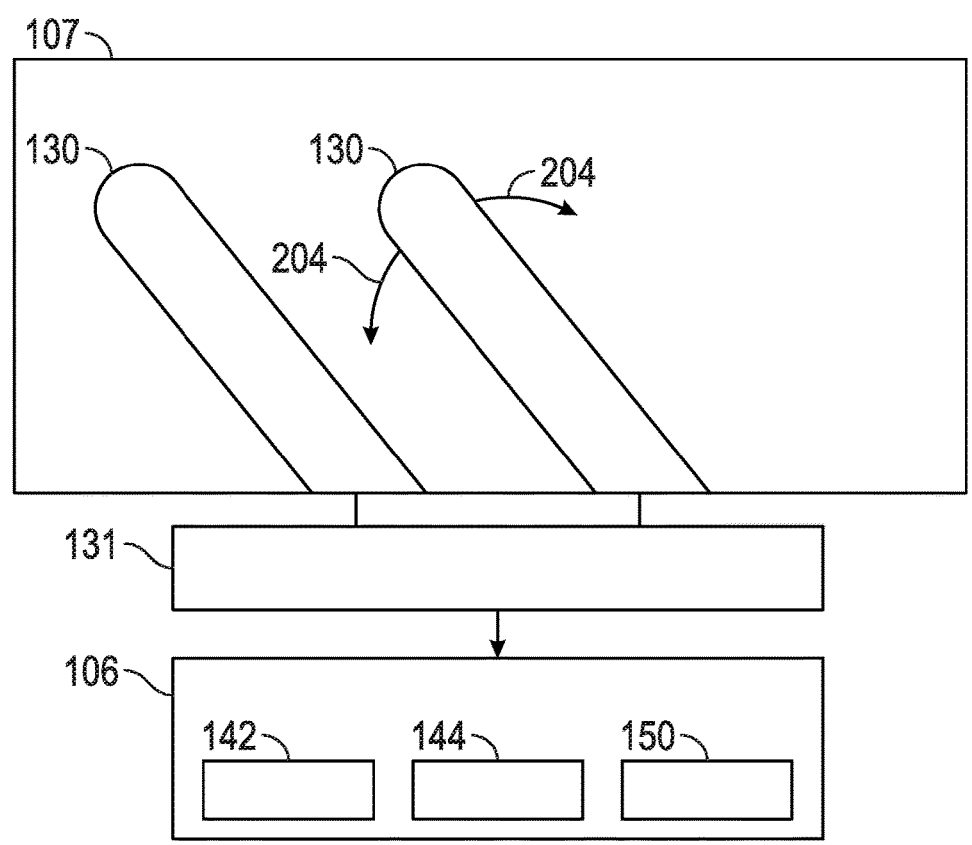
FIG. 2 is an illustration of the front windshield, the front windshield wiper unit, and the control system of FIG. 1, in accordance with an exemplary embodiment.
Figure 3:
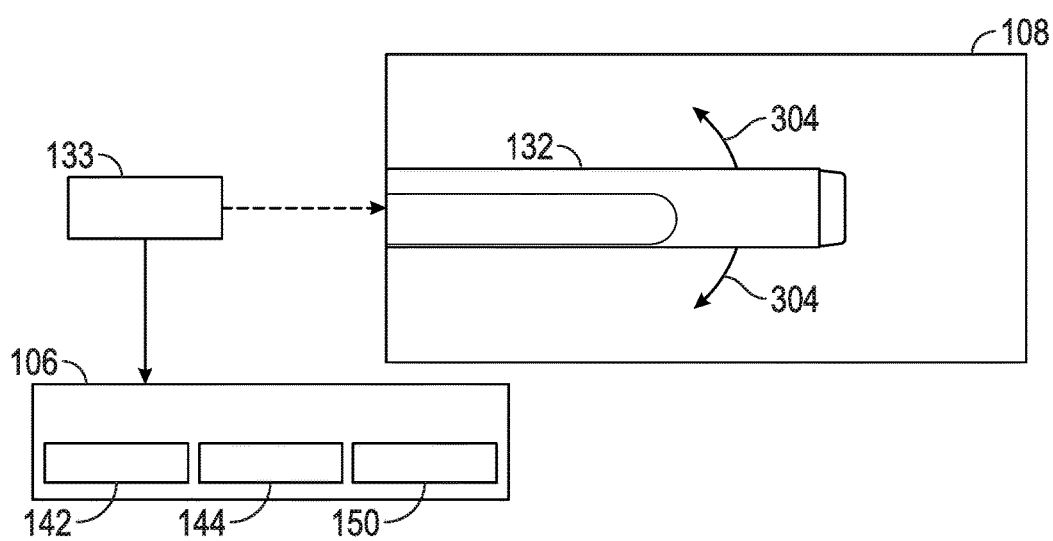
FIG. 3 is an illustration of the rear windshield, the rear windshield wiper unit, and the control system of FIG. 1, in accordance with an exemplary embodiment.

As depicted in FIG. 1, each of the wiper systems 104 include respective blades and actuators. Specifically, as depicted in FIG. 1, the front wiper system 109 includes one or more blades 130 and actuators 131. Similarly, also as depicted in FIG. 1, the rear wiper system 110 includes one or more blades 132 and actuators 133. For ease of illustrations, the front wiper system 109 is also depicted in FIG. 2 with respect to the front windshield 107 and the control system 106 in accordance with one exemplary embodiment. Similarly, the rear wiper system 110 is also depicted in FIG. 3 with respect to the rear windshield 108 and the control system 106 in accordance with one exemplary embodiment. In various embodiments, the wiper systems 109, 110 are capable of operating in different modes (e.g., based on a user's engagement of the user interface 142), including the following: (i) a high mode (in which the wiper blades 130 and/or 132 operate at a relatively high speed); (ii) a low mode (in which the wiper blades 130 and/or 132 operate at a relatively low speed); (iii) an intermittent mode (in which the wiper blades 130 and/or 132 operate intermittently with a time delay); (iv) an off mode (in which the wiper blades 130 and/or 132 do not move); and (v) a one time wiper mode (in which the wiper blades 130 and/or 132 move a single time and then stop).

With reference to both FIG. 1 and FIG. 2, in one embodiment the front wiper system 109 includes two blades 130 and associated actuator(s) 131. It will be appreciated that the number of blades 130 and/or actuators 131 may vary. The wiper blades 130 move in one or more directions 204 along a surface of the front windshield 107. The movement of the blades 130 is controlled via the one or more actuators 131. In one embodiment, a controller 150 of the control system 106 (e.g. a processor 152 thereof, as depicted in FIG. 1) controls operation of the actuators 131, including control of intermittent operation thereof, via instructions provided to the actuators 131 for controlling the blades 130 that are based on the user's engagement of the user interface 142.

With reference to both FIG. 1 and FIG. 3, in one embodiment the rear wiper system 110 includes one blades 132 and associated actuator(s) 133. It will be appreciated that the number of blades 132 and/or actuators 133 may vary. The wiper blades 132 move in one or more directions 304 along a surface of the rear windshield 108. The movement of the blades 132 is controlled via the one or more actuators 133.

In one embodiment, a controller 150 of the control system 106 (e.g. a processor 152 thereof, as depicted in FIG. 1) controls operation of the actuators 131 via instructions provided to the actuators 133 for controlling the blades 132 that are based on the user's engagement of the user interface 142.

It will be appreciated that in certain embodiments the number of windshields 102, wiper systems 104, and/or control systems 106 may vary. In certain embodiments, the intermittent control may apply only to one of the wiper systems 104 (e.g. the front wiper system 109), while in other embodiments the intermittent control may apply to two or more wiper systems 104 (e.g. both the front and rear wiper systems 109, 110). In addition, while a single control system 106 is illustrated in FIG. 1, it will be appreciated that in certain embodiments that different wiper systems 104 (e.g. the front wiper system 109 and the rear wiper system 110) may use one or more different control systems 106, including one or more different interfaces 142 and/or other components.

In one embodiment, the control system 106 is mounted on the chassis 112. As discussed above, the control system 106 provides control of, including for intermittent operation of, one or more wiper systems 104 (e.g., in one embodiment, the front and rear wiper systems 109, 110), as set forth in greater detail in connection with the discussion of FIGS. 2-6.

As depicted in FIG. 1, in one embodiment the control system 106 comprises the above-referenced user interface 142 and controller 150, in addition to one or more detection units 144 and a display system 151. While the components of the control system 106 (including the user interface 142, the detection units 144, the controller 150, and the display system 151) are depicted as being part of the same system, it will be appreciated that in certain embodiments these features may comprise two or more systems, and/or that different systems and/or components may be utilized for different wiper systems 104 (e.g. for the front and rear wiper systems 109, 110) in different embodiments. In addition, in various embodiments the control system 106 may comprise all or part of, and/or may be coupled to, various other vehicle devices and systems, such as, among others, the wiper system 104, the actuator assembly, the electronic system 118, and/or one or more other systems of the vehicle 100.

The user interface 142 receives user inputs from a user of the vehicle 100 (e.g. a driver of the vehicle 100) for controlling one or more wiper systems 104. In one embodiment, the user interface 142 is used by the driver or other user of the vehicle 100 for controlling both the front and rear wiper systems 109, 110. In other embodiments, the user interface 142 may be used for a single wiper system 104 (e.g. the front wiper system 109), and/or different user interfaces 142 may be used for different wiper systems 104.

Figure 4:
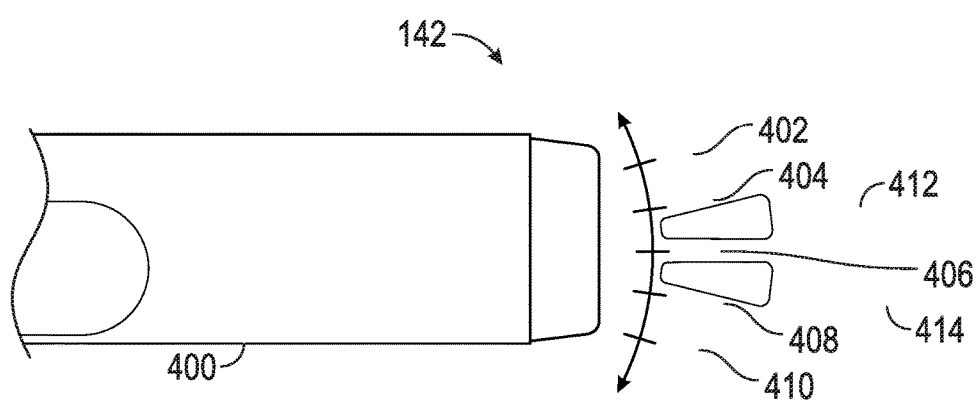
FIG. 4 is an illustration of a user interface of the control system of FIG. 1, and that is configured for use in controlling the front and rear windshield wiper units of FIGS. 1-3, in accordance with an exemplary embodiment.
Figure 5A:
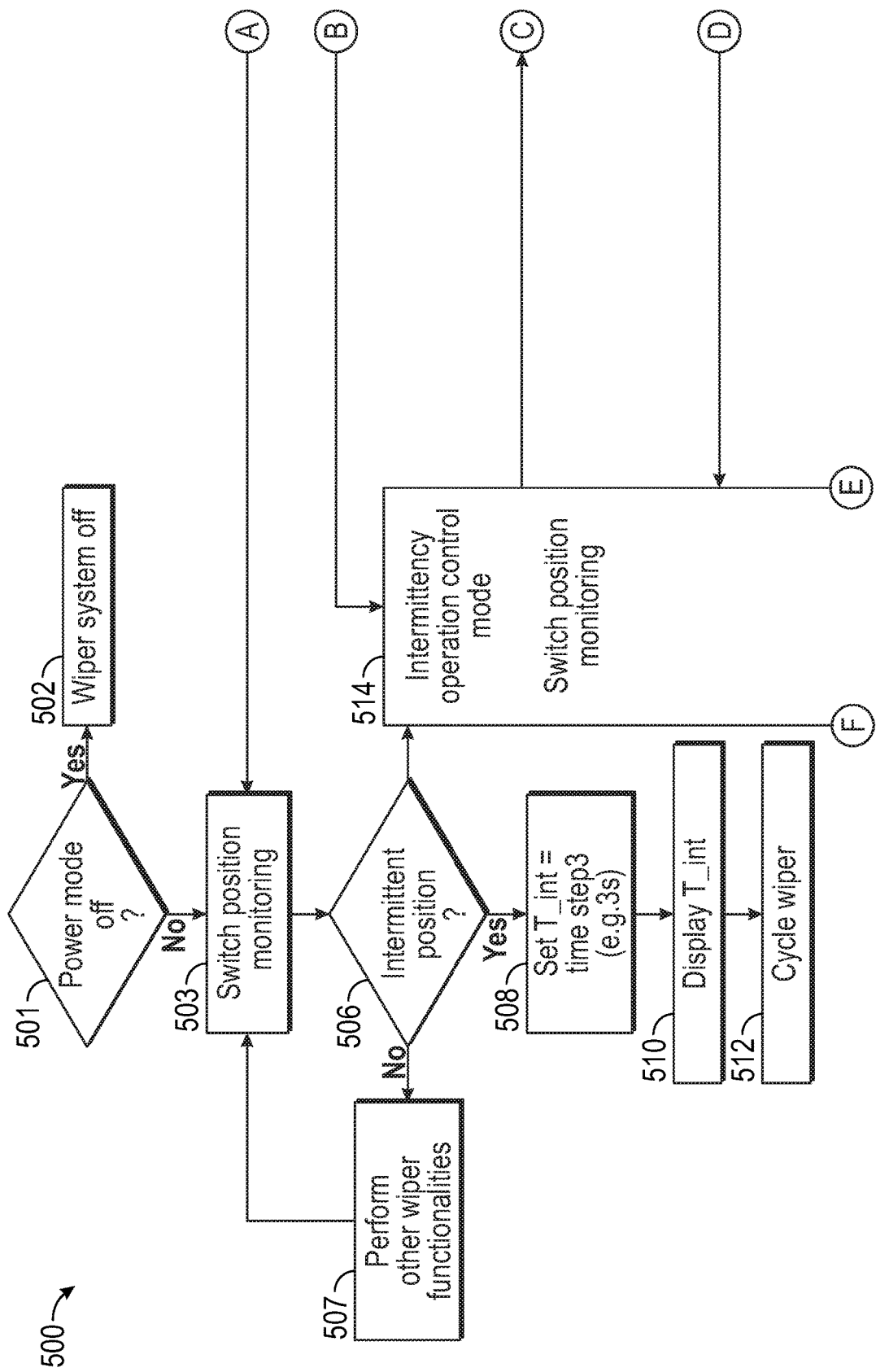
FIG. 5 is a flowchart of a process for controlling intermittent operation of a vehicle windshield wiper system, and that can be implemented in connection with the vehicle of FIG. 1, and the windshields, wiper systems, control system, and user interface of FIGS. 1-4, in accordance with an exemplary embodiment (FIG. 5 includes a single, four page flowchart, with the pages of the single flowchart labelled as FIGS. 5A-5D in the Drawings, and which collectively shall be reference as FIG. 5 herein)
Figure 5B:
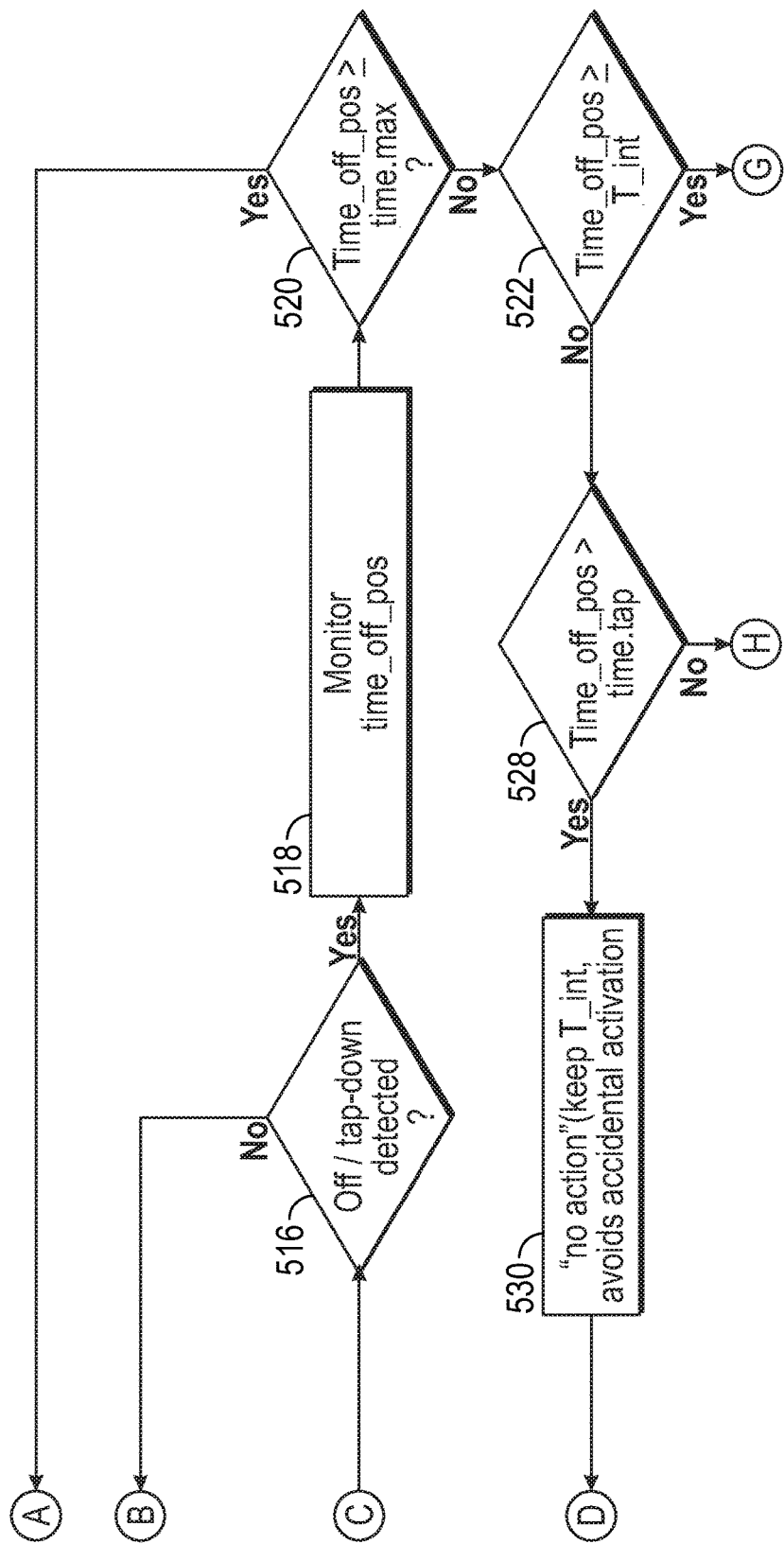
Figure 5C:
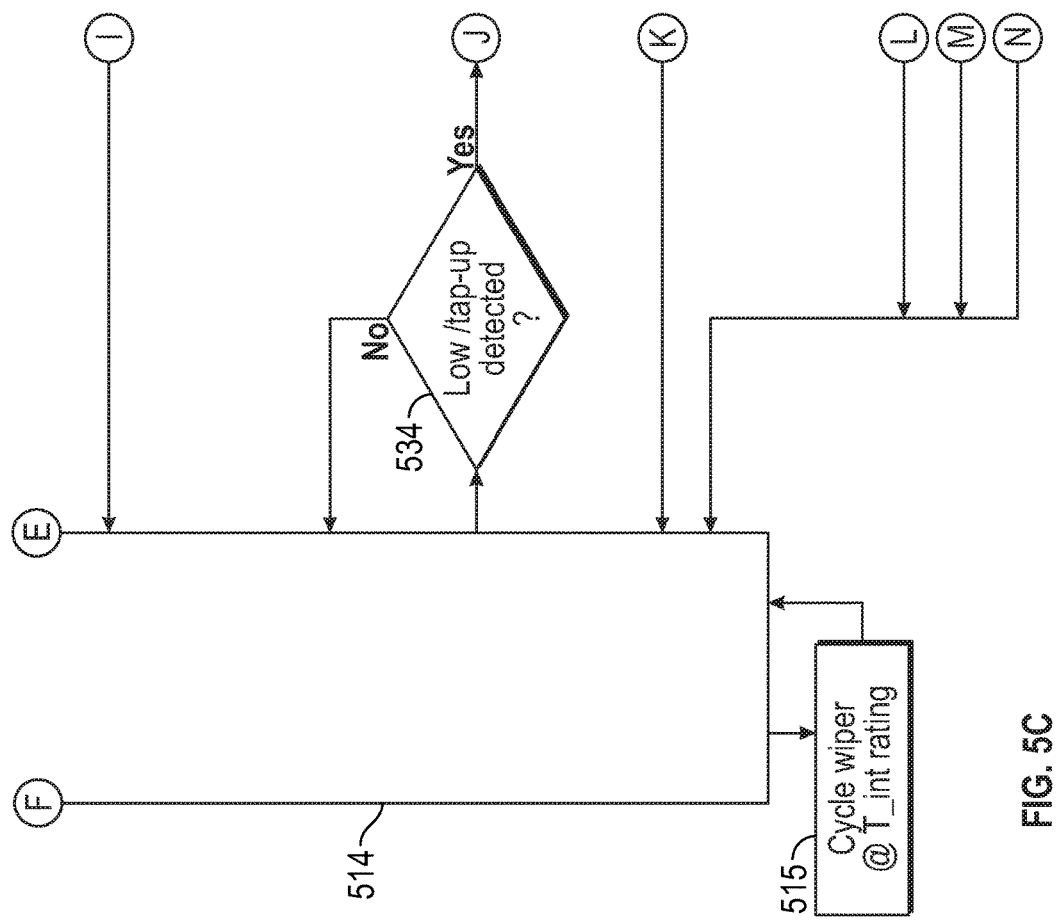
Figure 5D:
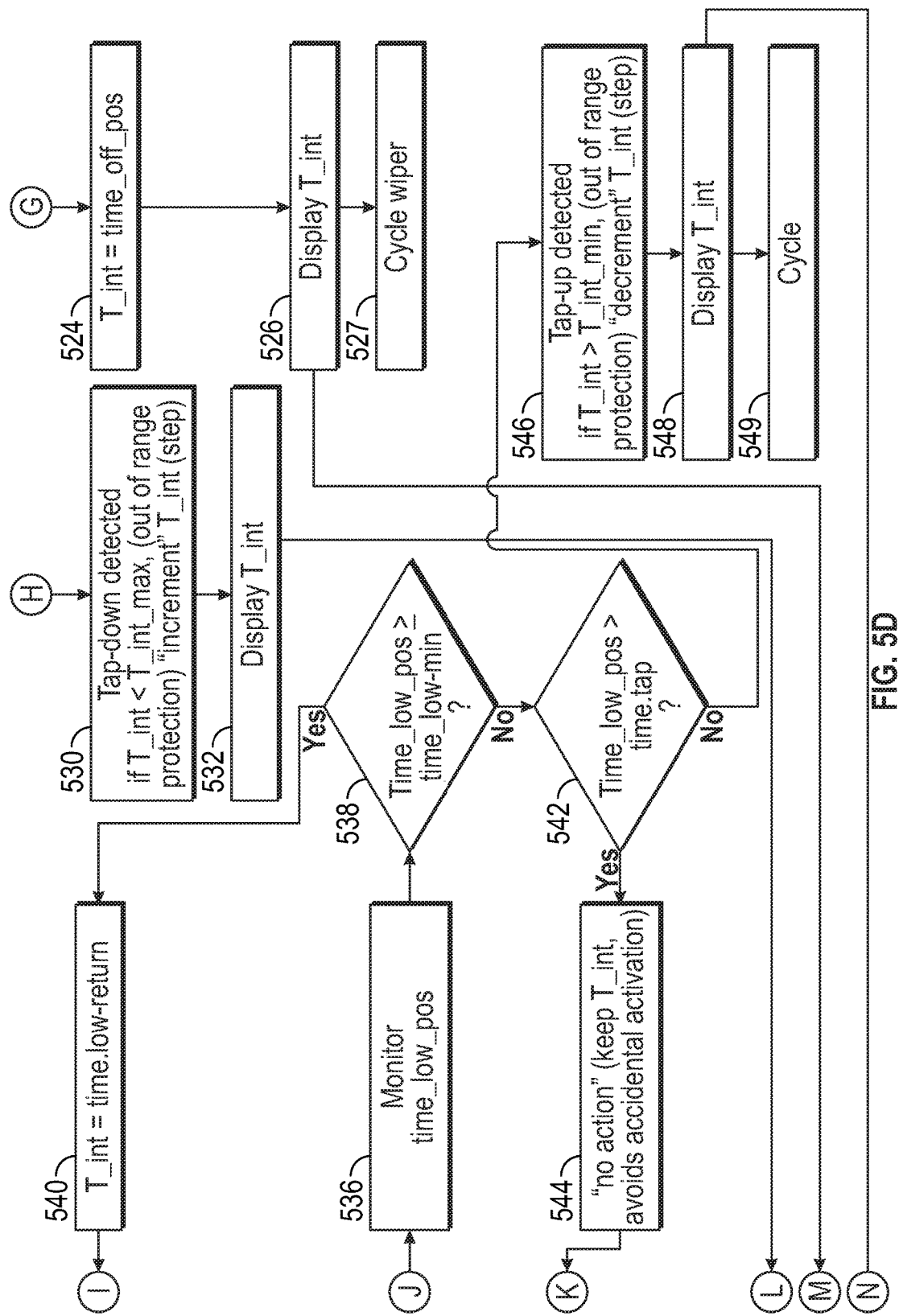

With reference to FIG. 4, in one embodiment the user interface 142 comprises a device 400, for example that is disposed proximate a steering wheel of the vehicle 100. As depicted in FIG. 4, the device is movable between multiple positions, such as a first position 402 (also referred to herein as a high mode position, corresponding to a relatively high speed for the wiper system blade movement), a second position 404 (also referred to herein as a low mode position, corresponding to a relatively low speed for the wiper system blade movement), a third position 406 (also referred to herein as an intermittent mode position 406, corresponding to intermittent speed operation of the blade(s) of the wiper system), a fourth position 408 (also referred to herein as an off position 408, corresponding to the wiper system not operating or the blades not moving), and a fifth position 410

(also referred to herein as a one time wiper mode position, in which the wiper system operates with the blade(s) moving a single time). In one embodiment, the device 400 is movable between these positions, by a driver or other user (collectively referred to as a user) of the vehicle 100, by a tap up 412 or tap down 414 between the different positions 402-410. In one embodiment, (i) the high mode position 402 results in the wiper system(s) being operated in the above-discussed high mode (in which the wiper blades 130 and/or 132 operate at a relatively high speed); (ii) the low mode position 404 results in the wiper system(s) being operated in the above-discussed low mode (in which the wiper blades 130 and/or 132 operate at a relatively low speed); (iii) the intermittent mode position 406 results in the wiper system(s) being operated in the above-discussed intermittent mode (in which the wiper blades 130 and/or 132 operate intermittently with a time delay); (iv) the off position 408 results in the wiper system(s) being placed in the above-discussed off mode (in which the wiper blades 130 and/or 132 do not move); and (v) the one time wiper mode position results in the wiper system(s) being operated in the above-discussed one time wiper mode (in which the wiper blades 130 and/or 132 move a single time and then stop).

Returning to FIG. 1, in one embodiment, the detection units 144 are coupled to the user interface 142, and detect and measure the user's engagement with the user interface 142 (e.g. including when the user taps the device 400 of FIG. 4 of the user interface 142 up and down). In certain embodiments, the one or more detection units 144 read, detect and/or measure one or more features of the user interface 142, such as with respect to the activation time, engagement (e.g. tapping up and tapping down) and/or operation of the interface 142 (e.g. including how long the user has tapped the user interface 142 up or down). In certain embodiments, the detection units 144 may be coupled to the user interface 142. In certain embodiments, the detection units 144 may be part of the user interface 142. In certain embodiments, the detection units 144 may be part of and/or coupled to a control unit, such as the control system 106, the electronic system 118, another engine control unit, and/or one or more other systems. In certain embodiments, the detection units 144 comprise one or more input pins or circuits. In other embodiments, the detection units 144 may comprise one or more sensors, among other possible variations.

Also in one embodiment, the control system 106 is coupled to the user interface 142, the detection units 144, and the display system 151. The control system 106 utilizes the various measurements and information from the detection units 144 (and/or from the user interface 142), and automatically controls the wiper systems 104, including intermittent operation thereof, based on the measured engagement of the user interface 142 by the user, for example in accordance with the steps discussed further below in connection with the processes 500, 600 of FIGS. 5 and 6.

As depicted in FIG. 1, the control system 106 comprises a computer system. In certain embodiments, the control system 106 may also include one or more of the user interface 142, one or more of the detection units 144, one or more other devices and/or systems, and/or components thereof. In addition, it will be appreciated that the control system 106 may otherwise differ from the embodiment depicted in FIG. 1. For example, the control system 106 may be coupled to or may otherwise utilize one or more remote computer systems and/or other systems, such as the electronic system 118 and/or one or more other systems of the vehicle 100.

In the depicted embodiment, the computer system of the control system 106 includes a processor 152, a memory 154, an interface 156, a storage device 158, and a bus 160. The processor 152 performs the computation and control functions of the control system 106, and may comprise any type of processor or multiple processors, single integrated circuits such as a microprocessor, or any suitable number of integrated circuit devices and/or circuit boards working in cooperation to accomplish the functions of a processing unit. During operation, the processor 152 executes one or more programs 162 contained within the memory 154 and, as such, controls the general operation of the control system 106 and the computer system of the control system 106, generally in executing the processes described herein, such as the process 200 described further below in connection with FIGS. 2-6.

The memory 154 can be any type of suitable memory. For example, the memory 154 may include various types of dynamic random access memory (DRAM) such as SDRAM, the various types of static RAM (SRAM), and the various types of non-volatile memory (PROM, EPROM, and flash). In certain examples, the memory 154 is located on and/or co-located on the same computer chip as the processor 152. In the depicted embodiment, the memory 154 stores the above-referenced program 162 along with one or more stored values 184.

The bus 160 serves to transmit programs, data, status and other information or signals between the various components of the computer system of the control system 106. The interface 156 allows communication to the computer system of the control system 106, for example from a system driver and/or another computer system, and can be implemented using any suitable method and apparatus. In one embodiment, the interface 156 obtains the various data from the detection units 144. The interface 156 can include one or more network interfaces to communicate with other systems or components. The interface 156 may also include one or more network interfaces to communicate with technicians, and/or one or more storage interfaces to connect to storage apparatuses, such as the storage device 158.

The storage device 158 can be any suitable type of storage apparatus, including direct access storage devices such as hard disk drives, flash systems, floppy disk drives and optical disk drives. In one exemplary embodiment, the storage device 158 comprises a program product from which memory 154 can receive a program 162 that executes one or more embodiments of one or more processes of the present disclosure, such as the steps of the process 200 (and any sub-processes thereof) described further below in connection with FIGS. 2-6. In another exemplary embodiment, the program product may be directly stored in and/or otherwise accessed by the memory 154 and/or a disk (e.g., disk 186), such as that referenced below.

The bus 160 can be any suitable physical or logical means of connecting computer systems and components. This includes, but is not limited to, direct hard-wired connections, fiber optics, infrared and wireless bus technologies. During operation, the program 162 is stored in the memory 154 and executed by the processor 152.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 152) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the control system 106 may also otherwise differ from the embodiment depicted in FIG. 1, for example in that the computer system of the control system 106 may be coupled to or may otherwise utilize one or more remote computer systems and/or other systems.

The display system 151 is coupled to the control system 106, and provides a display of the operation of one or more of the wiper systems 104 (e.g. the front wiper system 109). In certain embodiments, the display system 151 comprises a display screen that provides a visual indication of a current time delay for the intermittent mode of the wiper system. Also in certain embodiments, the display 151 also provides an indication of the current mode of one or more of the wiper systems 104 (e.g. the front wiper system 109) (e.g. including whether the wiper system is set to a high mode, a low mode, an intermittent mode, an off mode, or a one time wiper mode). In addition, in certain embodiments, the display 151 would also provide feedback to the user as to whether the user is tapping up or tapping down the user interface 142, and may also provide feedback for example as to whether the user is providing a short versus long press for the tap up or tap down, among other possible information. In certain other embodiments, display feedback may not be provided (and for example the customer may only rely on the wiper arm intermittence visual and/or audible feedback).

FIG. 5 is a flowchart of a process 500 for controlling intermittent operation of a windshield wiper assembly of a vehicle, in accordance with an exemplary embodiment. The process 500 can be implemented in connection with the vehicle 100 of FIG. 1, one or both of the windshields 102 of FIGS. 1-3, one or both of the wiper systems 104 of FIGS. 1-3, and the control system 106 (including the user interface 142 and other components) of FIGS. 1-4, in accordance with exemplary embodiments.

As depicted in FIG. 5, the process 500 begins at step 501. During step 501, a determination is made as to whether the power mode of the vehicle is off. In one embodiment, the assessment is made using one or more detection units 144 of FIG. 1 (e.g. one or more detection units coupled to an ignition system and/or other power system for the vehicle 100 of FIG. 1). In certain embodiments, this assessment is made by the processor 152 of FIG. 1 using information provided by such detection units 144.

If it is determined in step 501 that the power mode is off, then the wiper system is turned off (step 502). In one embodiment, one or both of the wiper systems 109, 110 of FIG. 1 are turned off via instructions provided by the processor 152 of FIG. 1.

Conversely, if it is determined in step 501 that the power mode is not off, then detection and monitoring is performed of a user's engagement of a user interface for the wiper/washer system (step 503). In one embodiment, the detection units 144 of FIG. 1 detect and monitor a user's engagement of the user interface 142 of FIGS. 1 and 4, and a position is obtained, detected, or otherwise determined for the user interface 142 for the one or more wiper systems 104. In various embodiments, a user's tapping of the user interface up and down in detected and monitored. Similar to the discussions above, in one embodiment the positions include the following (with reference to FIGS. 1-4): (i) the first position 402, or high mode position 402 of FIG. 4 that results in the wiper system(s) being operated in the high mode (in which the wiper blades 130 and/or 132 operate at a relatively high speed); (ii) the second position 404, or low mode position 404 of FIG. 4 that results in the wiper system(s) being operated in the low mode (in which the wiper blades 130 and/or 132 operate at a relatively low speed); (iii) the third position 406, or intermittent mode position 406 of FIG. 4 that results in the wiper system(s) being operated in the intermittent mode (in which the wiper blades 130 and/or 132 operate intermittently with a time delay); (iv) the fourth position 408, or off position 408 that results in the wiper system(s) being placed in the off mode (in which the wiper blades 130 and/or 132 do not move); and (v) the fifth position 410, or one time wiper mode position 410 of FIG. 4, that results in the wiper system(s) being operated in the one time wiper mode (in which the wiper blades 130 and/or 132 move a single time and then stop).

A determination is made as to whether the user interface is in the intermittent mode position (e.g. the third position 406 of FIG. 4) (step 506). In one embodiment, this determination is made by the processor 152 using information provided by the detection units 144 in step 503. In another embodiment, this determination is made, in whole or in part, by the detection units 144.

If it is determined in step 506 that the user interface is not in the intermittent mode position, then other wiper functionalities are provided (step 507). For example, in various embodiments, such functions include windshield wiping in accordance with one or more existing settings (e.g. windshield wiping in accordance with a predetermined continuous speed). In various embodiments, such other functionalities may include, by way of example, the high speed, low speed, and wiper off features, and/or any number of other different types of non-intermittent position features such as auto-wiper position (wiping cycles based on sensor), among other possible features.

Conversely, if it is determined in step 506 that the user interface is in the intermittent position, then a time step for the operation of the wiper system in the intermittent mode (also referred to herein as the Time (Intermittent) or $T_{INT}$) is set (or re-set) to a predetermined time step (step 508). In one embodiment, the default time step is equal to approximately three seconds. However, this may vary in other embodiments. Also in one embodiment, $T_{INT}$ is set by the processor 152 of FIG. 1.

A display is provided that includes the $T_{INT}$ setting (step 510). In one embodiment, the display of the $T_{INT}$ of step 508 is provided via a display screen of the display 151 of FIG. 1 via instructions provided by the processor 152 of FIG. 1 in step 528. The display includes the time step established in step 508.

In addition, the cycle wiper is implemented in accordance with the time step (step 512). In one embodiment, the cycle wiper is implemented in step 512 via instructions provided from the processor 152 of FIG. 1 to one or more actuators 131 and/or 133 of FIG. 1 to one or more actuators 131 and/or 133 of FIG. 1 to ensure the instantaneous movement of one or more wiper blades 130, 132 of FIG. 2 (in one embodiment, the wipers blades 130, 132 move in a temporary activation state is utilized, in which the wipers are activated a single time while in this state).

In addition, continued detection and monitoring is performed of the user's engagement of the user interface for the wiper/washer system (step 514). Similar to step 503, in one embodiment, the detection units 144 of FIG. 1 detect and monitor the user's engagement of the user interface 142 of FIGS. 1 and 4, and the position is obtained, detected, or otherwise determined for the user interface 142 for the one or more wiper systems 104. Also in one embodiment, the one or more wiper systems 104 are operated in the intermittent wiper mode via the control system 106 of FIG. 1 while the detection and monitoring and other steps of path 507 are performed, provided that the vehicle power allows it. In addition, in one embodiment, as the detection and monitoring of step 514 continues, an intermittent activation of the wiper system is provided in accordance with the current value of $T_{INT}$ (step 515).

A determination is made as to whether the user interface is in the off position (i.e. the fourth position 408 of FIG. 4) or the tap-down position (i.e., position 414 of FIG. 4) (step 516). In one embodiment, this determination is made by the processor 152. In another embodiment, this determination is made, in whole or in part, by the detection units 144.

If it is determined in step 516 that the user interface is in the off position or the tap-down position, then a timer is initiated (step 518). In one embodiment, the processor 152 initiates the timer by keeping a count of an elapsed time in which the user interface 142 remains in the off position or the tap-down position.

In addition, as part of the monitoring, in one embodiment a value is obtained for an amount of time in which the user interface has most recently been in the off position (e.g. position 408 of FIG. 4) or tap-down position (e.g. position 414 of FIG. 4). In one embodiment, this amount of time (hereafter referred to as the Time (Off Position) or $T_{op}$, refers to an amount of time elapsed during the most recent usage of the timer of step 518 during the most recent setting of the user interface in the off position or the tap-down position. Also in one embodiment, this value is stored in the memory 154 of FIG. 1 as one of the stored values 164 thereof and retrieved from the memory 154 by the processor 152 of FIG. 1.

A determination is made as to whether the $T_{op}$ value is greater than or equal to a maximum time threshold $T_{max}$ (step 520). In one embodiment, the maximum time threshold is equal to sixteen seconds; however, this may vary in other embodiments. In one embodiment, $T_{max}$ is stored in the memory 154 of FIG. 1 as one of the stored values 164 thereof. In one embodiment, these determinations made via the processor 152 of FIG. 1.

If it is determined that $T_{op}$ is greater than or equal to $T_{max}$ then the process returns to step 503, as switch position monitoring is continued. Conversely, if it is determined that that $T_{op}$ is less than $T_{max}$ then the process proceeds to step 522, discussed directly below.

During step 522, a determination is made as to whether $T_{op}$ is greater than or equal to the current value of $T_{INT}$. In one embodiment, this determination is made via the processor 152 of FIG. 1.

If the condition of step 522 is satisfied (i.e., that $T_{op}$ is greater than or equal to the current value of $T_{INT}$), then the time step for the operation of the wiper system in the intermittent mode ($T_{INT}$) is set (or re-set) equal to $T_{op}$ (step 524). In one embodiment, $T_{INT}$ is set by the processor 152 of FIG. 1. In one embodiment, during step 524 an activation is provided for a feature in which (i) the intermittency interval is set (between x and y seconds, which values may vary in different embodiments); (ii) the intermittency level is turned on; and (iii) the system goes back to off and waits for the desired interval before (iv) moving back to the intermittent position.

A display is provided that includes the $T_{INT}$ setting of step 524 (step 526). In one embodiment, the display of the $T_{INT}$ in step 526 is provided via a display screen of the display 151 of FIG. 1 via instructions provided by the processor 152 of FIG. 1 in step 526. The display includes the time step established in step 524.

In addition, the cycle wiper is implemented in accordance with the time step of step 524 (step 527). In one embodiment, the cycle wiper is implemented in step 527 via instructions provided from the processor 152 of FIG. 1 to one or more actuators 131 and/or 133 of FIG. 1 to ensure the instantaneous movement of one or more wiper blades 130, 132 of FIG. 2 (in one embodiment, the wipers blades 130, 132 move in a temporary activation state is utilized, in which the wipers are activated a single time while in this state).

With reference back to step 522, if it is determined that $T_{op}$ is less than the current value of $T_{INT}$, then a determination is made as to whether $T_{op}$ is greater than a predetermined threshold, referred to herein has a "Time Tap" value, or $T_{tap}$. (step 528). In one embodiment, this threshold, $T_{tap}$, is equal to one hundred milliseconds (100 ms); however, this may vary in other embodiments. In one embodiment, this determination is made via the processor 152 of FIG. 1.

If it is determined that $T_{op}$ of step 518 is greater than the $T_{tap}$ threshold value, then no change is made for the operation of the wiper system in the intermittent mode ($T_{INT}$) (step 530). In one embodiment, no change in the $T_{INT}$ is made (e.g. the processor 152 makes no changes to $T_{INT}$), for example to avoid any accidental activation. In one embodiment, this is to avoid accidental activation (e.g. if a driver inadvertently engages the off position of the user interface and then attempts to undo the activation). In such embodiment, the $T_{INT}$ value is not changed, for example because changing the $T_{INT}$ in response to an inadvertent act could potentially reduce customer satisfaction. The process then returns to step 514, as additional monitoring is performed.

Conversely, if it is determined that $T_{op}$ is less than or equal to the $T_{tap}$ threshold, then a tap down is detected, and the time step for the operation of the wiper system in the intermittent mode ($T_{INT}$) is incremented (provided, in one embodiment, that $T_{INT}$ remains less than a maximum value, $T_{INTMAX}$) (step 530). In one embodiment, $T_{INTMAX}$ is equal to eighteen seconds; however, this may vary in other embodiments. In addition, a display is provided that includes the $T_{INT}$ setting of step 530 (step 532). In one embodiment, the display of the $T_{INT}$ is provided via a display screen of the display 151 of FIG. 1 via instructions provided by the processor 152 of FIG. 1 in step 546. The process then returns to step 514, as additional monitoring is performed.

A determination is made as to whether a tap-up or low signal has been detected with respect to the user interface (step 534). In one embodiment, as used herein, a low signal refers to the user interface being in or commanded toward a "low mode position", or, a position indicating a relatively low speed for operation of the wiper system (e.g. corresponding to the second position 404 of FIG. 4), and a tap-up signal refers to a tap-up of the user interface, for example corresponding to position 412 of FIG. 4. In one embodiment, this determination is made by the processor 152 using information provided by the detection units 144 in step 503. In another embodiment, this determination is made, in whole or in part, by the detection units 144.

If it is determined that a tap-up or low signal is detected in step 534, then continued monitoring is performed of the user interface with respect to the low position (e.g. position 404 of FIG. 4) or the tap-up position (e.g. position 412 of FIG. 4) (step 536). In one embodiment, the monitoring is continued via the detection units 144 and the processor 152 of FIG. 1.

In one embodiment, as part of the continued monitoring of step 536, a timer is initiated monitoring an amount of time in which the user interface is in the low position. In one embodiment, a value is obtained, using the timer, for an amount of time in which the user interface has been in the low mode position or tap-up position. In one embodiment, this amount of time (hereafter referred to as the Time (Low mode position) or $T_{LP}$, refers to an amount of time elapsed during the current engagement of the user interface in the low mode position. Also in one embodiment, this value is determining via the processor 152 of FIG. 1 using the timer, and is stored in the memory 154 of FIG. 1 as one of the stored values 164 thereof.

During step 538, a determination is made as to whether the $T_{LP}$ value is greater than or equal to a minimum time threshold $T_{min}$. In one embodiment, the minimum time threshold is equal to five seconds; however, this may vary in other embodiments. In one embodiment, $T_{min}$ is stored in the memory 154 of FIG. 1 as one of the stored values 164 thereof. In one embodiment, this determination is made via the processor 152 of FIG. 1.

If it is determined in step 538 that the $T_{LP}$ value is greater than or equal to the minimum time threshold $T_{min}$, then the $T_{INT}$ value is set equal to a low return time value (step 540). In one embodiment, the $T_{INT}$ value is set in this manner by the processor 152 of FIG. 1. In one embodiment, the low return time value is equal to three seconds; however, this may vary in other embodiments. In various embodiments, this is to ensure that a "Rain-down comfort mode" is maintained. In various embodiments, the $T_{INT}$ value is set equal to the low return time value in step 540 in order to ensure that a "rain down comfort mode" is provided for the system, rather than re-using the previously stored $T_{INT}$ value under these circumstances. For example, in one embodiment, if the time spent on the "low" position is greater than the applicable predetermined threshold, this serves as an indication that it has been raining. Then, when the user puts the user interface back to an intermittent position, under these conditions the best intermittent time reference may no longer the previously stored $T_{INT}$ value. Rather, step 540 employs the understood fact that it was raining to a point that the user left the wiper on the "low" position for a while, and now that the user desires something "a little bit less" under these circumstances.

Conversely, if it is determined in step 538 that the $T_{LP}$ value is less than the minimum time threshold $T_{min}$, then a determination is made as to whether the $T_{LP}$ value is greater than the $T_{Tap}$ value (step 542). In one embodiment, this determination is made via the processor 152 of FIG. 1.

If it is determined in step 542 that the $T_{LP}$ value is greater than the $T_{Tap}$ value, then no change is made for the operation of the wiper system in the intermittent mode ($T_{INT}$) (step 544). In one embodiment, no change in the $T_{INT}$ is made (e.g. the processor 152 makes no changes to $T_{INT}$). In one embodiment, this is to avoid accidental activation (e.g. if a driver inadvertently engages the low position of the user interface and then attempts to undo the activation). In such embodiment, the $T_{INT}$ value is not changed, for example because changing the $T_{INT}$ in response to an inadvertent act could potentially reduce customer satisfaction.

Conversely, if it is determined in step 542 that the $T_{LP}$ value of step 550 is deemed to be less than or equal to the $T_{Tap}$ value, then a tap up is detected, and the time step for the operation of the wiper system in the intermittent mode ($T_{INT}$) is decremented (step 546). In addition, a display is provided that includes the $T_{INT}$ setting of step 546 (step 548). In one embodiment, the display of the $T_{INT}$ is provided via a display screen of the display 151 of FIG. 1 via instructions provided by the processor 152 of FIG. 1 in step 548.

In addition, in certain embodiments, the cycle wiper is implemented in accordance with the time step of step 546 (step 549). In one embodiment, the cycle wiper is implemented in step 549 via instructions provided from the processor 152 of FIG. 1 to one or more actuators 131 and/or 133 of FIG. 1 to ensure the instantaneous movement of one or more wiper blades 130, 132 of FIG. 2 (in one embodiment, the wipers blades 130, 132 move in a temporary activation state is utilized, in which the wipers are activated a single time while in this state).

The process then returns to step 514, as additional monitoring is performed.

Figure 6:
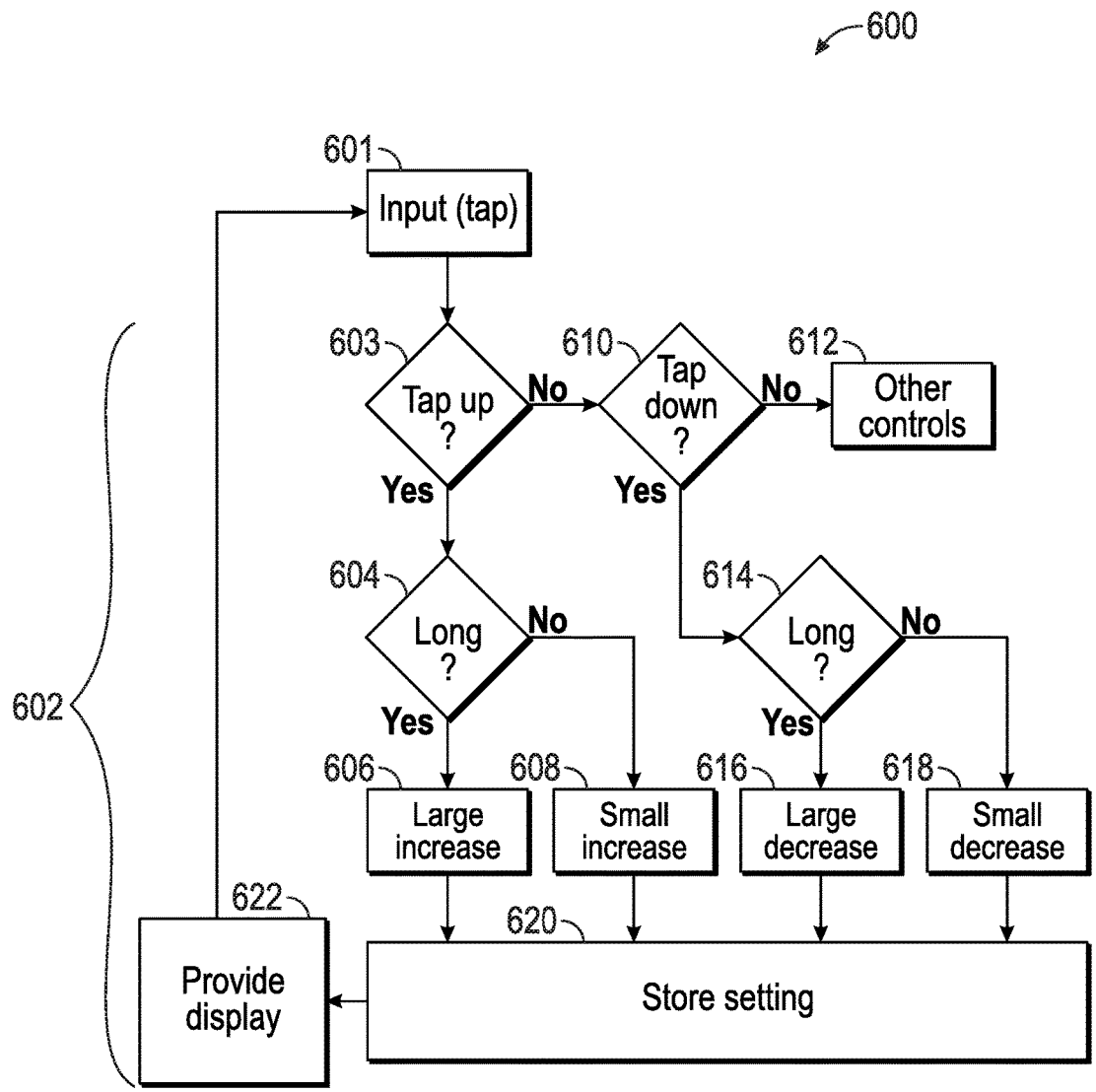
FIG. 6 is a flowchart of a further process for controlling intermittent operation of a vehicle windshield wiper system, and that can be implemented in connection with the vehicle of FIG. 1, and the windshields, wiper systems, control system, and user interface of FIGS. 1-4, in accordance with an exemplary embodiment.

FIG. 6 is a flowchart of a process 600 for controlling operation of a windshield wiper assembly of a vehicle, in accordance with an exemplary embodiment. The process 600 can be implemented in connection with the vehicle 100 of FIG. 1, one or both of the windshields 102 of FIGS. 1-3, one or both of the wiper systems 104 of FIGS. 1-3, and the control system 106 (including the user interface 142 and other components) of FIGS. 1-4, in accordance with exemplary embodiments.

As depicted in FIG. 6, the process 600 begins at step 601. During step 501, detection of the power mode is provided (e.g. similar to steps 503 and/or 514 of FIG. 5). In one embodiment, the detection units 144 of FIG. 1 detect and monitor a user's engagement of the user interface 142 of FIGS. 1 and 4, and a position is obtained, detected, or otherwise determined for the user interface 142 for the one or more wiper systems 104. In various embodiments, a user's tapping of the user interface up and down in detected and monitored. In various embodiments, a duration of an amount of time of such tapping is also detected and monitored.

The wiper system is controlled based on the detected engagement (as depicted with reference to sub-process 602 depicted in FIG. 6). In various embodiments, control of an intermittent time step, and/or one or more other features of the wiper system, are controlled based on a direction and duration of the user's tapping of the user interface up or down, for example as detailed in FIG. 6 and described below with reference to steps 603-622 in accordance with one exemplary embodiment.

During step 603, a determination is made as to whether the user interface has been tapped upward by the user (e.g., in a direction toward the roof of the vehicle, in one embodiment). In one embodiment, this determination is made by the processor 152 using information provided by the detection units 144 in step 603. In another embodiment, this determination is made, in whole or in part, by the detection units 144.

If it is determined in step 603 that the user interface has been tapped upward, then a determination is made as to whether the duration of the upward tapping or number of times (or pulses) of the upward tapping or number of times (or pulses) of the upward tapping exceeds a predetermined threshold (step 604). In one embodiment, the predetermined threshold equals one second; however, this may vary in other embodiments. In one embodiment, this determination is made by the processor 152 of FIG. 1.

If it is determined in step 604 that the duration of the upward tapping or number of times (or pulses) of the upward tapping exceeds the predetermined threshold of step 604, then the upward tapping of the user interface is deemed to a be a relatively long tapping, and control of the user interface is exercised accordingly in step 606. In one embodiment, a time step for intermittent operation of the wiper system (e.g. of one or more blades thereof) is increased by a first magnitude in step 606, via instructions provided by the processor 152 of FIG. 1. In one embodiment, the time step is increased from a prior or default value. In one such example, an initial or default time step is equal to four seconds, and the time step is increased to twenty two seconds in step 606. However, this may vary in other embodiments. In one embodiment, when a long upward tapping is detected, the time step is automatically increased to its maximum value; however, this may vary in one embodiment. In one such embodiment, this maximum value is equal to twenty two seconds; however, this may also vary in other embodiments. The process then proceeds to step 620, described further below.

Conversely, if it is determined in step 604 that the duration of the upward tapping or number of times (or pulses) of the upward tapping is less than or equal to the predetermined threshold of step 604, then the upward tapping of the user interface is deemed to a be a relatively short tapping, and control of the user interface is exercised accordingly in step 608. In one embodiment, a time step for intermittent operation of the wiper system (e.g. of one or more blades thereof) is increased by a second magnitude in step 608 that is less than the first magnitude of step 606, via instructions provided by the processor 152 of FIG. 1. In one embodiment, the time step is increased from a prior or default value. In one such example, an initial or default time step is equal to four seconds, and the time step is increased to eight seconds in step 608. However, this may vary in other embodiments. In one embodiment, when a short upward tapping is detected, the time step is automatically increased from its prior value to its next highest incremental value. Also in one embodiment, the incremental values are (1) one second; (2) two seconds, (3) four seconds; (4) eight seconds; and (5) twenty two seconds. Accordingly, in this embodiment, when a short upward tapping is detected, the time step (1) increases to two seconds if the prior time step is one second; (2) increases to four seconds if the prior time step is two seconds; (3) increases to eight seconds if the prior time step is four seconds; and (4) increases to twenty two seconds if the prior time step is eight seconds. However, this may vary in other embodiments. The process then proceeds to step 620, described further below.

With reference back to step 603, if it is determined instead in step 603 that the user interface has not been tapped upward, then a determination is made as to whether the user interface has been tapped downward by the user (e.g., in a direction toward the floor of the vehicle, in one embodiment) (step 610). In one embodiment, this determination is made by the processor 152 using information provided by the detection units 144 in step 603. In another embodiment, this determination is made, in whole or in part, by the detection units 144.

If it is determined in step 610 that the user interface has been tapped downward, then a determination is made as to whether the duration of the downward tapping or number of times (or pulses) of the downward tapping exceeds a predetermined threshold (step 614). In one embodiment, the predetermined threshold equals one second; however, this may vary in other embodiments. In one embodiment, this determination is made by the processor 152 of FIG. 1.

If it is determined in step 614 that the duration of the downward tapping or number of times (or pulses) of the downward tapping exceeds the predetermined threshold of step 614, then the downward tapping of the user interface is deemed to a be a relatively long tapping, and control of the user interface is exercised accordingly in step 616. In one embodiment, a time step for intermittent operation of the wiper system (e.g. of one or more blades thereof) is decreased by a first magnitude in step 616, via instructions provided by the processor 152 of FIG. 1. In one embodiment, the time step is decreased from a prior or default value. In one such example, an initial or default time step is equal to four seconds, and the time step is decreased to one second in step 616. However, this may vary in other embodiments. In another example, if the prior time step is equal to twenty two seconds, then the new time step may be adjusted to one second due to the relatively long downward tapping. However, this may also vary in other embodiments. In one embodiment, when a long downward tapping is detected, the time step is automatically increased to its minimum value; however, this may vary in one embodiment. In one such embodiment, this minimum value is equal to one second; however, this may also vary in other embodiments.

Conversely, if it is determined in step 614 that the duration of the downward tapping or number of times (or pulses) of the downward tapping is less than or equal to the predetermined threshold of step 614, then the downward tapping of the user interface is deemed to a be a relatively short tapping, and control of the user interface is exercised accordingly in step 618. In one embodiment, a time step for intermittent operation of the wiper system (e.g. of one or more blades thereof) is decreased by a second magnitude in step 618 that is less than the first magnitude of step 616, via instructions provided by the processor 152 of FIG. 1. In one embodiment, the time step is decreased from a prior or default value. In one such example, an initial or default time step is equal to four seconds, and the time step is decreased to two seconds in step 618. However, this may vary in other embodiments. In one embodiment, when a short downward tapping is detected, the time step is automatically decreased from its prior value to its next lowest incremental value. Also in one embodiment the incremental values are (1) one second; (2) two seconds, (3) four seconds; (4) eight seconds; and (5) twenty two seconds, similar to the discussion above. Accordingly, in this embodiment, when a short downward tapping is detected, the time step (1) decreases to eight seconds if the prior time step is twenty two seconds; (2) decreases to four seconds if the prior time step is eight seconds; (3) decreases to two seconds if the prior time step is four seconds; and (4) decreases to one second if the prior time step is two seconds. However, this may vary in other embodiments. The process then proceeds to step 620, described directly below.

As noted above, the process proceeds to step 620 upon performance of any of steps 606, 608, 616, or 618. During step 620, a setting associated with the current (i.e. revised) time step of step 606, 608, 616, or 618 (whichever is performed in the most recent, current iteration) is stored in memory. In one embodiment, the setting is stored in the memory 154 of FIG. 1 as one of the stored values 164 thereof. Also in various embodiments, the setting is stored for subsequent iterations (including future ignition cycles and vehicle drives for the vehicle), so that in such subsequent iterations the time step for the intermittent wiper system setting will begin at the stored value rather than a factory default setting. This allows for customization to the individual user's preferences.

In addition, during step 622, a display is provided. In various embodiments, the display comprises a display shown on a display screen that provides a visual indication of a current time delay for the intermittent mode of the wiper system. Also in certain embodiments, the display also provides an indication of the current mode of one or more of the wiper systems 104 (e.g. the front wiper system 109) (e.g. including whether the wiper system is set to a high mode, a low mode, an intermittent mode, an off mode, or a one time wiper mode). In addition, in certain embodiments, the display 151 also provides feedback to the user as to whether the user is tapping up or tapping down the user interface 142, and may also provide feedback for example as to whether the user is providing a short versus long press for the tap up or tap down, among other possible information. Also in various embodiments, the display is provided via the display system 151 of FIG. 1 in accordance with instructions provided by the processor 152 of FIG. 1.

With reference back to step 610, if it is determined in step 610 that the user interface has not been tapped downward, then the process proceeds to step 612. During step 612, the wiper system is controlled based on the particular type of engagement provided by the user (e.g., pressing a button, sliding or rotating part of the user interface, and/or one or more other non-tapping types of engagement). In one embodiment, such control is made via instructions provided by the processor 152.

Accordingly, methods, systems, and vehicles are provided for controlling operation of a wiper system of a vehicle in an intermittent operating mode. In various embodiments, a time step for the intermittent operating mode is updated based upon a user's engagement of a user interface for the wiper system, including a time for which the user interface has been in an off position, an amount of time for which the user interface has been in a low mode position, and an amount of time for which the user interface has been moved (e.g. tapped) up or down. Also in various embodiments, the methods, systems, and vehicle allow for the use of a tap-up and tap-down feature for controlling one or more of the wiper systems 104. Also in various embodiments, the methods, system, and vehicle allow for the use of smart compensation techniques for controlling intermittent speed of the wiper blades of one or more of the wiper systems 104, for example by storing the intermittent speed setting for subsequent use rather than automatically reverting back to a factory setting, along with various other features (such as understanding a customer's input and displaying feedback for the customer).

It will be appreciated that the disclosed methods, systems, and vehicles may vary from those depicted in the Figures and described herein. For example, the vehicle 100, the windshield(s) 102, the wiper system(s) 104, the control system 106, and/or components thereof (e.g., the user interface 142) may vary from that depicted in FIGS. 1-4 and described in connection therewith. It will similarly be appreciated that certain steps of the processes 500, 600 may vary from those depicted in FIGS. 5 and/or 6 and/or described above in connection therewith. It will similarly be appreciated that certain steps of the methods described above may occur simultaneously or in a different order than that depicted in FIGS. 5 and/or 6 and/or described above in connection therewith.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the appended claims and the legal equivalents thereof.

The invention claimed is:

1. A method comprising:
   detecting, via a detection unit disposed onboard a vehicle having a windshield and a wiper system for the windshield, a tapping of a user interface for the wiper system; and
   controlling an intermittent speed the wiper system based at least in part on a direction and duration or number of times of the tapping of the user interface, wherein the step of controlling the intermittent speed comprises:
      increasing the intermittent speed by a first magnitude if the tapping comprises an upward tapping that is less than a first predetermined threshold; and
      increasing the intermittent speed by a second magnitude, greater than the first magnitude, if the tapping comprises an upward tapping that is greater than the first predetermined threshold.

2. The method of claim 1, wherein the step of controlling the intermittent speed further comprises:
   decreasing the intermittent speed by a third magnitude if the tapping comprises a downward tapping that is less than a second predetermined threshold; and
   decreasing the intermittent speed by a fourth magnitude, greater than the third magnitude, if the tapping comprises a downward tapping that is greater than the second predetermined threshold.

3. The method of claim 1, further comprising:
   storing a setting for the intermittent speed for subsequent use in a future driver cycle for the vehicle.

4. The method of claim 1, further comprising:
   providing a display for the intermittent speed, the tapping of the user interface, or both.

5. A method comprising:
   detecting, via a detection unit disposed onboard a vehicle having a windshield and a wiper system for the windshield, an amount of time pertaining to a position or engagement of a user interface for the wiper system, wherein the step of detecting the amount of time comprises detecting a time value representing a duration of time in which the user interface has remained in an off position, a duration of time in which the user interface has remained in a low position, or both; and
   updating a time step for intermittent operation for the wiper system based at least in part on the duration of time in which the user interface has remained in an off position, a duration of time in which the user interface has remained in a low position, or both.

6. The method of claim 5, wherein:
   the step of detecting the amount of time comprises detecting a time value representing a duration of time in which the user interface has remained in the off position; and the step of updating the time step comprises updating the time step based at least in part on the duration of time in which the user interface has remained in the off position.

7. The method of claim 5, wherein:

the step of detecting the amount of time comprises detecting a time value representing a duration of time in which the user interface has remained in the low mode position; and the step of updating the time step comprises updating the time step based at least in part on the duration of time in which the user interface has remained in the low mode position.

8. The method of claim 5, wherein:

the step of detecting the amount of time further comprises detecting a time value representing a duration of time in which the user interface has been engaged by a user of the vehicle; and the step of updating the time step further comprises updating the time step based at least in part on the duration of time in which the user interface has been engaged by the user of the vehicle.

9. The method of claim 5, wherein:

the step of detecting the amount of time further comprises detecting a time value representing a duration of time or number of times in which the user interface has been tapped upward or downward by a user of the vehicle; and the step of updating the time step further comprises updating the time step based at least in part on the duration of time or number of times in which the user interface has been tapped upward or downward by the user of the vehicle.

10. The method of claim 5, wherein: the step of detecting the amount of time further comprises:

detecting a tap time value representing a duration of time in which the user interface has been tapped upward or downward by a user of the vehicle; and detecting a low mode position time value representing a duration of time in which the user interface has remained in a low mode position; and the step of updating the time step further comprises:

setting the time step to be equal to a predetermined low mode position time step value if the low mode position time value is greater than a predetermined minimum value;

decrementing the time step if the low mode position time value is less than the predetermined minimum value, provided further that the low mode position time value is less than the tap time value; and keeping the time step the same if the low mode position time value is less than the predetermined minimum value and greater than the tap time value.

11. The method of claim 5, wherein:

the step of detecting the amount of time comprises detecting an off position time value representing a duration of time in which the user interface has remained in the off position; and the step of updating the time step comprises setting the time step to a predetermined default value if the off position time value is greater than a predetermined maximum threshold.

12. The method of claim 11, wherein:

the step of detecting the amount of time further comprises detecting a tap time value representing a duration of time in which the user interface has been tapped upward or downward by a user of the vehicle; and the step of updating the time step further comprises:

setting the time step to be equal to the off position time value if the off position time value is less than the predetermined maximum threshold and greater than a current value of the time stamp;

keeping the time stamp the same if the off position time value is less that the current value of the time stamp and greater than the tap time value; and incrementing time stamp if the tap time value is greater than the off position time value.

13. The method of claim 5, further comprising: displaying the time step for a user of the vehicle.

14. The method of claim 5, further comprising:

storing the time step for subsequent use in a future driver cycle for the vehicle.

15. A method comprising:

detecting, via a detection unit disposed onboard a vehicle having a windshield and a wiper system for the windshield, a tapping of a user interface for the wiper system;

controlling the wiper system based at least in part on the tapping of the user interface; and providing a display for the intermittent speed, the tapping of the user interface, or both.

16. The method of claim 15, further comprising:

storing a setting for the intermittent speed for subsequent use in a future driver cycle for the vehicle.

* * * * *